US012704331B2

(12) United States Patent
Le et al.

(10) Patent No.: US 12,704,331 B2
(45) Date of Patent: Aug. 11, 2026

(54) HEAT EXCHANGER HAVING COMPLIANT MANIFOLDS

(71) Applicant: Hamilton Sundstrand Corporation, Charlotte, NC (US)

(72) Inventors: Tung Le, Enfield, CT (US); Grum T. Ngatu, South Windsor, CT (US); Matthew Roger Cyr, Berlin, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 396 days.

(21) Appl. No.: 18/097,702

(22) Filed: Jan. 17, 2023

(65) Prior Publication Data

US 2024/0240881 A1 Jul. 18, 2024

(51) Int. Cl.
*F28F 9/02* (2006.01)
*B33Y 80/00* (2015.01)
(Continued)

(52) U.S. Cl.
CPC ............ *F28F 9/0246* (2013.01); *B33Y 80/00* (2014.12); *F28D 7/0025* (2013.01);
(Continued)

(58) Field of Classification Search
CPC .... F28F 9/0246; F28F 7/02; F28F 9/02; F28F 9/0239; F28F 9/0243; F28F 2250/106;
(Continued)

(56) References Cited

U.S. PATENT DOCUMENTS 2,933,291 A 4/1960 Huggins
3,229,762 A * 1/1966 Vollhardt ................ F28D 7/005 165/157
(Continued)

FOREIGN PATENT DOCUMENTS

CN 110186306 A 8/2019
EP 3531058 A1 * 8/2019 ............. F28D 21/00
(Continued)

OTHER PUBLICATIONS

European Search Report dated Jun. 5, 2024 for European Patent Application No. 24152401.6.

*Primary Examiner* — Ljiljana V. Ciric
(74) *Attorney, Agent, or Firm* — Bachman & LaPointe, P.C.

(57) ABSTRACT

A heat exchanger having a core including a plurality of parallel layered flow passages for accommodating a first fluid flow, and a plurality of layered cross-flow passages in thermal communication with the layered flow passages for accommodating a second fluid flow, an inlet manifold associated with an inlet side of the core and including an inlet for the first fluid flow, a manifold wall having a bellows-type construction to accommodate expansion and an interface with the core that includes an array of flow ports in communication with the layered flow passages of the core, and an outlet manifold associated with an outlet side of the core and including an outlet for the first fluid flow, a manifold wall having a bellows-type construction to accommodate expansion and an interface with the core that includes an array of flow ports in communication with the layered flow passages of the core.

14 Claims, 5 Drawing Sheets

(51) Int. Cl.
*F28D 7/00* (2006.01)
*F28D 9/00* (2006.01)
*F28F 7/02* (2006.01)

(52) U.S. Cl.
CPC .............. *F28D 9/0037* (2013.01); *F28F 7/02* (2013.01); *F28F 9/02* (2013.01); *F28F 9/0239* (2013.01); *F28F 9/0243* (2013.01); *F28F 2250/106* (2013.01); *F28F 2265/26* (2013.01)

(58) Field of Classification Search
CPC .... F28F 2265/26; B33Y 80/00; F28D 7/0025; F28D 9/0037
See application file for complete search history.

(56) References Cited

U.S. PATENT DOCUMENTS

| | | | | |
|---|---|---|---|---|
| 5,551,504 | A * | 9/1996 | Zifferer | F28F 1/06 165/155 |
| 9,964,077 | B2 * | 5/2018 | Neal | F01P 3/20 |
| 10,107,555 | B1 * | 10/2018 | Miller | B23P 15/26 |
| 10,443,959 | B2 * | 10/2019 | Streeter | F28F 9/0268 |
| 10,539,377 | B2 * | 1/2020 | Turney | F28F 9/02 |
| 10,584,922 | B2 * | 3/2020 | Herring | F28D 7/0008 |
| 10,746,326 | B2 * | 8/2020 | Custer | F16L 9/19 |
| 10,801,790 | B2 * | 10/2020 | Streeter | B33Y 80/00 |
| 10,962,293 | B2 | 3/2021 | Tajiri et al. | |
| 11,079,181 | B2 * | 8/2021 | Disori | F28F 9/02 |
| 11,118,838 | B2 * | 9/2021 | Joseph | F28D 1/0475 |
| 12,013,190 | B2 * | 6/2024 | Strange | B23P 15/26 |
| 12,209,823 | B2 * | 1/2025 | Kirsch | B33Y 10/00 |
| 12,416,449 | B2 * | 9/2025 | Runk | F28F 17/005 |
| 2007/0187071 | A1 | 8/2007 | Miyagawa et al. | |
| 2014/0048238 | A1 * | 2/2014 | Tan | F28F 9/02 165/173 |
| 2017/0248372 | A1 * | 8/2017 | Erno | F28F 9/0275 |
| 2018/0195813 | A1 * | 7/2018 | Turney | F28F 9/0243 |
| 2018/0238627 | A1 * | 8/2018 | Herring | F28F 13/08 |
| 2018/0283794 | A1 * | 10/2018 | Cerny | F28F 9/0268 |
| 2018/0283795 | A1 * | 10/2018 | Cerny | F28F 1/12 |
| 2019/0264982 | A1 | 8/2019 | Tajiri et al. | |
| 2019/0285364 | A1 * | 9/2019 | Streeter | F28F 9/0268 |
| 2019/0339012 | A1 | 11/2019 | Disori et al. | |
| 2020/0103174 | A1 | 4/2020 | Frechette et al. | |
| 2021/0102756 | A1 * | 4/2021 | Becene | F28F 7/02 |
| 2021/0131736 | A1 * | 5/2021 | Joardar | F28D 1/05391 |
| 2024/0240881 | A1 * | 7/2024 | Le | F28F 7/02 |
| 2025/0129990 | A1 * | 4/2025 | Kilchyk | B33Y 80/00 |

FOREIGN PATENT DOCUMENTS

| | | | | |
|---|---|---|---|---|
| EP | 3564610 A1 | | 11/2019 | |
| EP | 3800417 A1 | * | 4/2021 | F28D 7/0016 |
| EP | 3855104 B1 | * | 2/2024 | F28F 7/02 |
| JP | 2007212075 A | * | 8/2007 | F28D 15/0266 |
| JP | 6628233 B2 | * | 1/2020 | F28F 7/02 |
| WO | WO-2020059774 A1 | * | 3/2020 | F28F 13/08 |

* cited by examiner

HEAT EXCHANGER HAVING COMPLIANT MANIFOLDS

BACKGROUND OF THE DISCLOSURE

1. Field of the Disclosure

The subject disclosure is directed to heat exchangers, and more particularly, to a heat exchanger having compliant inlet and outlet manifolds that are adapted and configured to reduce thermal and pressure stresses during operation.

2. Description of Related Art

Conventional and additive heat exchangers are well known in industries for providing a compact, low-weight, and highly effective means of exchanging heat from a hot fluid to a cold fluid. Heat exchangers that operate at elevated temperatures, such as those used in conjunction with in modern aircraft engines, often have short service lives due to high thermal stresses, which, in many cases, causes thermal fatigue and eventual failure of the component.

A conventional or additive heat exchanger typically includes a manifold and a core, where the manifold is either welded or brazed to the core to make a heat exchanger. This design will result in high thermal stress and pressure stress on the manifold, which is a critical issue when designing a high temperature, and high-pressure heat exchanger, such as those employed in modern aircraft engines.

The subject disclosure provides a solution to this design issue by employing a compliant manifold having a bellows-type construction that is adapted and configured to accommodate thermal and pressure stresses that would typically lead to thermal fatigue and eventual failure of the component.

SUMMARY OF THE DISCLOSURE

The subject disclosure is directed to a new and useful heat exchanger that is constructed with a core including a plurality of parallel layered flow passages for accommodating a first fluid flow having a first temperature, and a plurality of layered cross-flow passages in thermal communication with the layered flow passages for accommodating a second fluid flow having a second temperature lower than the first temperature.

An inlet manifold is operatively associated with an inlet side of the core and it includes an inlet to receive the first fluid flow, a manifold wall having a bellows-type construction to accommodate expansion and an interface with the core that includes an array of flow ports in fluid communication with the layered flow passages of the core.

An outlet manifold is operatively associated with an outlet side of the core and it includes an outlet for egress of the first fluid flow, a manifold wall having a bellows-type construction to accommodate expansion and an interface with the core that includes an array of flow ports in fluid communication with the layered flow passages of the core.

In one embodiment of the heat exchanger, the manifold wall of each manifold extends along a longitudinal axis and has a generally semi-circular configuration in a cross-section taken transverse to the longitudinal axis. In another embodiment of the heat exchanger, the manifold wall of each manifold extends along a longitudinal axis and has a generally crescent shaped configuration in a cross-section taken transverse to the longitudinal axis.

The manifold wall of each manifold of the heat exchanger includes a plurality of integrally formed longitudinally spaced apart segments that are each connected to one another by a shaped expansion joint. In one embodiment of the heat exchanger, each shaped expansion joint has a generally rectangular shape in a cross-sectional plane extending radially from the longitudinal axis of the manifold. In another embodiment of the heat exchanger, each shaped expansion joint has a generally dovetailed shape in a cross-sectional plane extending radially from the longitudinal axis of the manifold. In yet another embodiment of the heat exchanger, each shaped expansion joint has a generally L-shaped configuration in a cross-sectional plane extending radially from the longitudinal axis of the manifold. In still another embodiment of the heat exchanger, each shaped expansion joint has a generally T-shaped configuration in a cross-sectional plane extending radially from the longitudinal axis of the manifold. In another embodiment of the heat exchanger, each shaped expansion joint has a generally curved, rounded or generally circular configuration in a cross-sectional plane extending radially from the longitudinal axis of the manifold.

These and other features of the heat exchanger of the subject disclosure will become more readily apparent from the following detailed description of the preferred embodiments taken in conjunction with the drawings.

BRIEF DESCRIPTION OF THE DRAWINGS

So that those skilled in the art will readily understand how to make and use the heat exchanger of the subject disclosure without undue experimentation, preferred embodiments thereof will be described in detail herein below with reference to the figures wherein:

FIG. 1*d* shows an alternative expansion joint of FIG. 1*c* that has a generally T-shaped shaped cross-sectional configuration;

FIG. 1*e* shows an alternative expansion joint of FIG. 1*c* that has a generally dovetail shaped cross-sectional configuration;

FIG. 1*f* shows another alternative expansion joint of FIG. 1*c* that has a rounded, curved or generally circular cross-sectional configuration;

DETAILED DESCRIPTION OF THE EMBODIMENTS

Figure 1A:
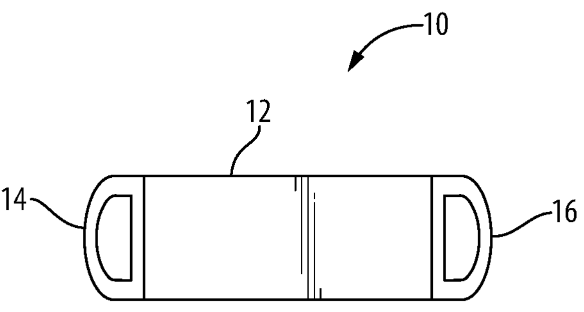
FIG. 1*a* is a schematic front elevation of a heat exchanger having compliant inlet and outlet manifolds that have a bellows-type configuration.
Figure 1B:
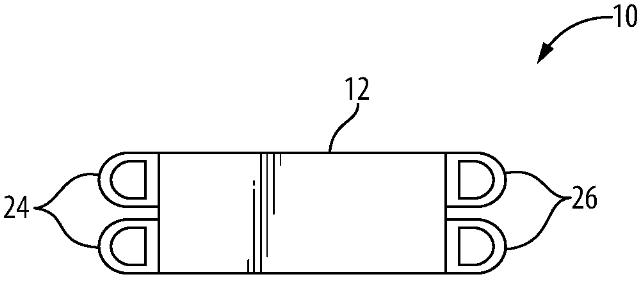
FIG. 1*b* is a schematic front elevation of a heat exchanger having split compliant inlet and outlet manifolds that have a bellows-type configuration.

Referring now to the drawings wherein like reference numeral identify similar features or components of the subject disclosure, there is illustrated in FIG. 1*a* schematic front elevation view of a heat exchanger constructed in accordance with the subject disclosure and designated generally by reference numeral 10. Heat exchanger 10 includes a multi-layered cross-flow core 12, an inlet manifold 14 operatively associated with an inlet side of the core 12, and an outlet manifold 16 operatively associated with an outlet side of the core 12. Alternatively, as shown in FIG. 1*b*, the heat exchanger 10 can gave split compliant inlet and outlet manifolds 24, 26.

Figure 1C:
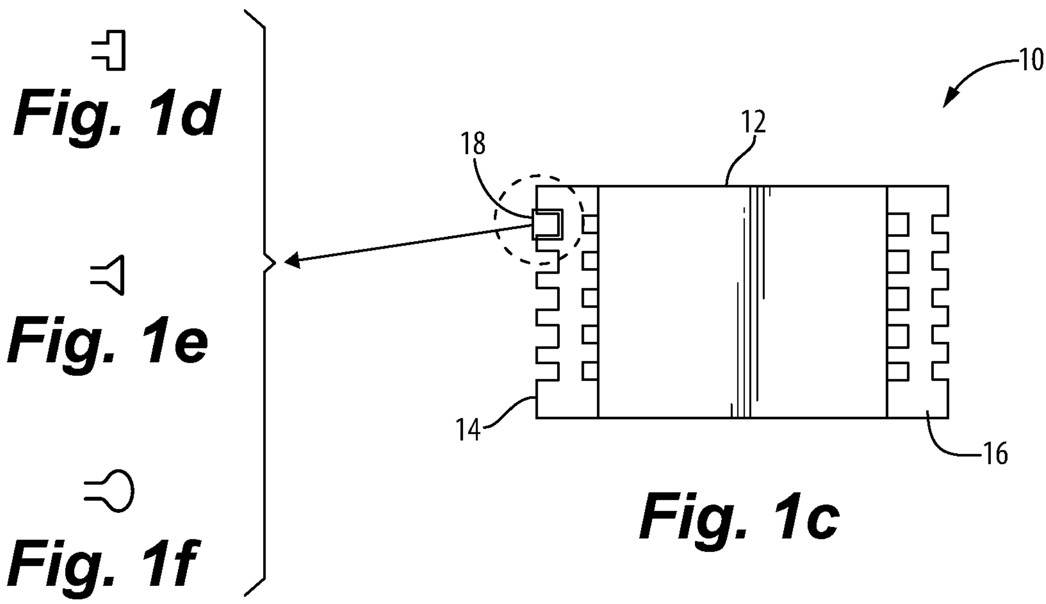
FIG. 1*c* is a schematic top plan view of a heat exchanger having compliant inlet and outlet manifolds that have a bellows-type configuration where the expansion joints have a generally rectangular shaped cross-sectional configuration.

As illustrated schematically in FIG. 1*c*, the walls of the inlet manifold 12 and the outlet manifold 14 have a bellows-type construction that is designed to accommodate expansion throughout the entire extent of each manifold so as to relieve thermal stress and pressure stress during operation. The bellows-type construction of manifolds 12, 14 includes a plurality of integrally formed longitudinally spaced wall sections or segments that are separated from one another by shaped expansion joints 18.

The shaped expansion joints 16 of the manifolds 12, 14 shown in FIG. 1*c* have a generally rectangular shaped cross-sectional configuration, whereas those shown in FIG. 1*d* have a generally T-shaped shaped cross-sectional configuration, and the expansion joints shown in FIG. 1*e* have a generally dovetail shaped cross-sectional configuration. Alternatively, as shown in FIG. 1*f*, the expansion joints have a rounded, curved or generally circular cross-sectional configuration. These expansion joint shapes are exemplary and should not be construed as limiting the subject disclosure in any way. Indeed, other expansion joint shapes are envisioned and described later in the subject disclosure. Furthermore, it is envisioned that the expansion joints of the bellows-type compliant manifolds could differ in shape, size, depth, width, pitch, amplitude, orientation, quantity, and/or bias to optimize the operational benefit of the manifold structure.

Figure 2:
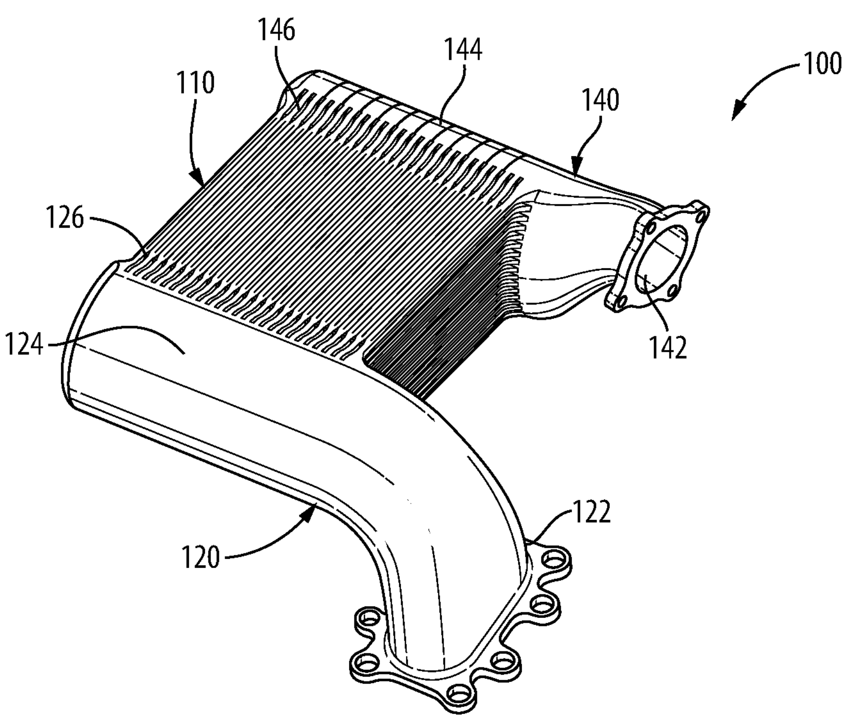
FIG. 2 is a perspective view of a heat exchanger having compliant inlet and outlet manifolds that have a bellows-type configuration.
Figure 3:
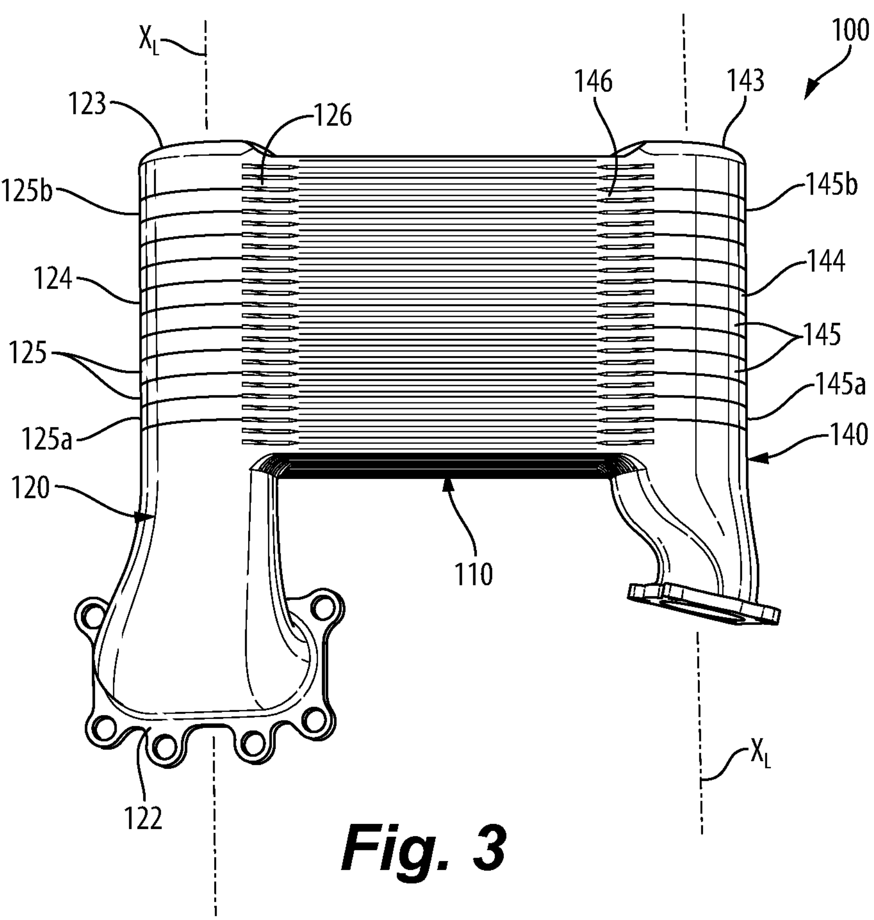
FIG. 3 is a top plan view of the heat exchanger shown in FIG. 2.
Figure 4:
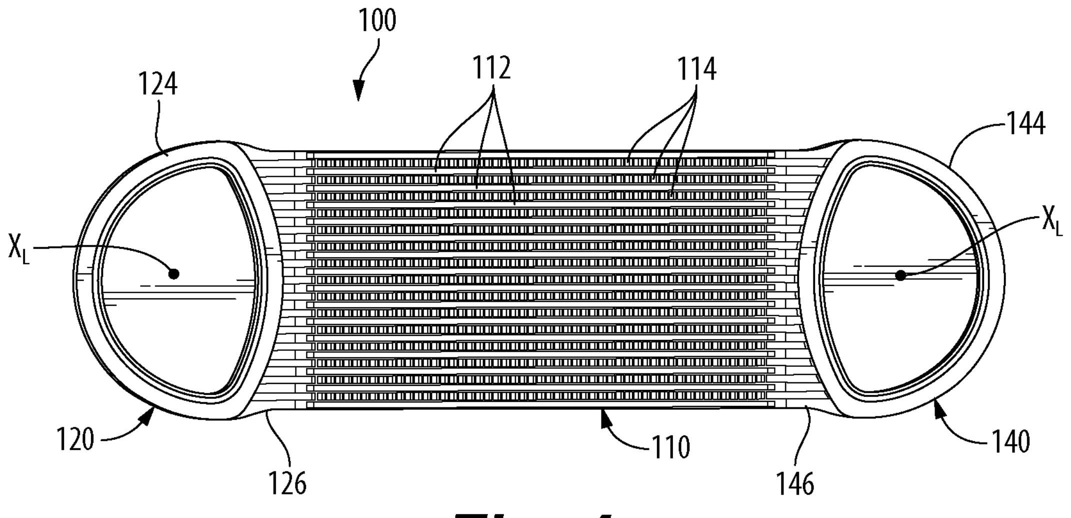
FIG. 4 is a cross-sectional view taken along line 4-4 of FIG. 3.

Referring now to FIGS. 2 through 4, there is illustrated a heat exchanger constructed in accordance with the subject disclosure and designated generally by reference numeral 100. Heat exchanger 100 has a generally rectangular or box-like core 110 that includes a plurality of parallel layered flow passages 112 for accommodating a first fluid flow having a first temperature, and a plurality of layered cross-flow passages 114 in thermal communication with the layered flow passages 112 for accommodating a second fluid flow having a second temperature lower than the first temperature. The alternating multi-layered, cross-flow construction of the heat exchanger core 110 is best seen in FIG. 4. Those skilled in the art will readily appreciate that the number and size of the layered flow passages 112 and cross-flow passages 114 can vary by design and/or application. Furthermore, the overall shape of the heat exchanger core 110 could vary by design and application and need not have a generally rectangular configuration, as depicted in the subject disclosure. Indeed, the heat exchanger core could have any polygonal three-dimensional configuration, such as, for example, a pentagonal or hexagonal configuration.

An elongated compliant inlet manifold 120 is operatively associated with an inlet side of the core 110. The inlet manifold 120 includes a flanged fluid inlet 122 to receive the first fluid flow, an outer manifold wall 124, an end wall 123 enclosing the manifold opposite the fluid inlet 122 and an inboard interface region 126 joined integrally with the core 110. The outer manifold wall 124 of inlet manifold 120 has a bellows-type construction to accommodate expansion (e.g., thermal and pressure induced expansion). The inboard interface region 126 of inlet manifold 120 includes an array of inflow ports 128 that are in fluid communication with the layered flow passages 112 of the core 110 to enable efficient flow between the inlet manifold 120 and the core 110. The array of inflow ports 128 are best seen in FIG. 5.

An elongated compliant outlet manifold 140 is operatively associated with an outlet side of the core 110. The outlet manifold includes a flanged fluid outlet 142 for egress or discharge of the first fluid flow, an outer manifold wall 144, an end wall 143 enclosing the manifold opposite the fluid outlet 142 and an inboard interface region 146 joined integrally with the core 110. The outer manifold wall 144 of outlet manifold 140 has a bellows-type construction to accommodate expansion. The inboard interface region 126 of outlet manifold 140 includes an array of outflow ports in fluid communication with the layered flow passages 112 of the core 110 to enable efficient flow between the outlet manifold 140 and the core 110. While not shown, the array of outflow ports is identical to the array of inflow ports 128 in inlet manifold 120, which are shown in FIG. 5.

As best seen in FIG. 4, the compliant outer manifold wall 124 of the inlet manifold 120 and the compliant outer manifold wall 144 of the outlet manifold 140 each extend along a respective longitudinal axis $X_L$ and each outer manifold wall 124, 144 has a curved or generally semi-circular configuration as viewed in a cross-sectional plane taken transverse to the longitudinal axis thereof.

Figure 5:
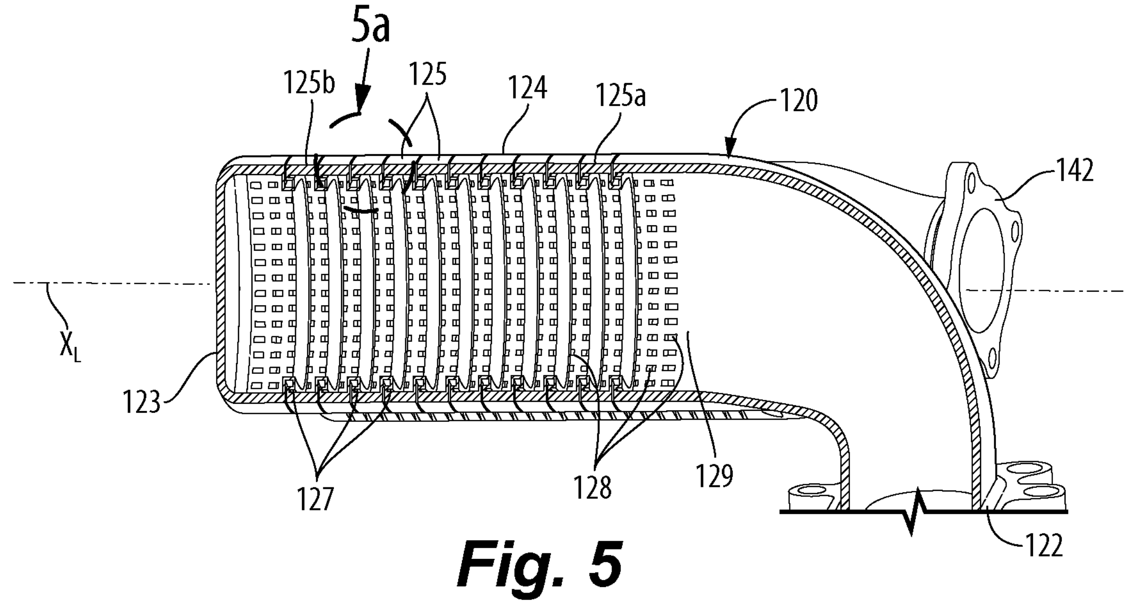
FIG. 5 is a cross-sectional view taken along line 5-5 of FIG. 3.

As shown in FIGS. 3 and 5, the outer manifold wall 124 of the inlet manifold 120 and the outer manifold wall 144 of the outlet manifold 140 each include a plurality of integrally formed, longitudinally spaced wall segments 125, 145. Adjacent wall segments 125, 145 are integrally connected to one another by shaped expansion joints 127. While not shown in the drawings, the spaced wall segments 145 are integrally connected to one another by identical shaped expansion joints. As shown, each wall segment 125, 145 has a common longitudinal width-wise dimension. However, it is envisioned and well within the scope of the subject disclosure that the number and width of the spaced apart wall segments 125, 145 can vary by design and/or application.

With continuing reference to FIG. 5, the first or initial wall segment **125*a* of the outer manifold wall 124, which is located adjacent the fluid inlet 122, is joined to the inlet plenum 129 of the inlet manifold 120 by a shaped expansion joint 127. The last or ultimate wall segment 125*b* of the outer manifold wall 124, which is located adjacent the end wall 123, is joined to the terminal section of the inlet manifold 120 by a shaped expansion joint 127. The outlet manifold 140** has a similar construction, as seen in FIG. 2.

Figure 5A:
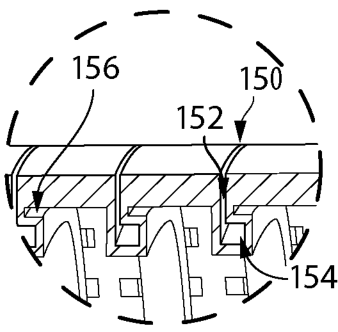
FIG. 5*a* is an enlarged localized view of the expansion joints of shown in FIG. 5.

In this embodiment of the compliant manifold, each shaped expansion joint 127, 147 has a generally square shaped configuration when viewed in a cross-sectional plane extending radially from the longitudinal axis $X_L$ of the manifold, as best seen in FIG. 5. Those skilled in the art will readily appreciate that the shape, size, width, depth, pitch, amplitude, frequency and/or orientation of the shaped expansion joints 127 of the inlet manifold 120 and the outlet manifold 140 can vary by design and/or application. Moreover, the shaped expansion joints 127 can have straight or linear surfaces and/or curved or rounded surfaces when viewed in a cross-sectional plane extending radially from the longitudinal axis $X_L$ of the manifold. FIG. 5*a* notably shows an L-shaped expansion joint with an L-shaped void 150. The leg 152 of the L-shaped void extends inward from the outer periphery of the manifold. Then the foot 154 of the L-shaped void extends axially. The manifold foot is thus also spaced inward of the outer wall by a gap 156.

Figure 6:
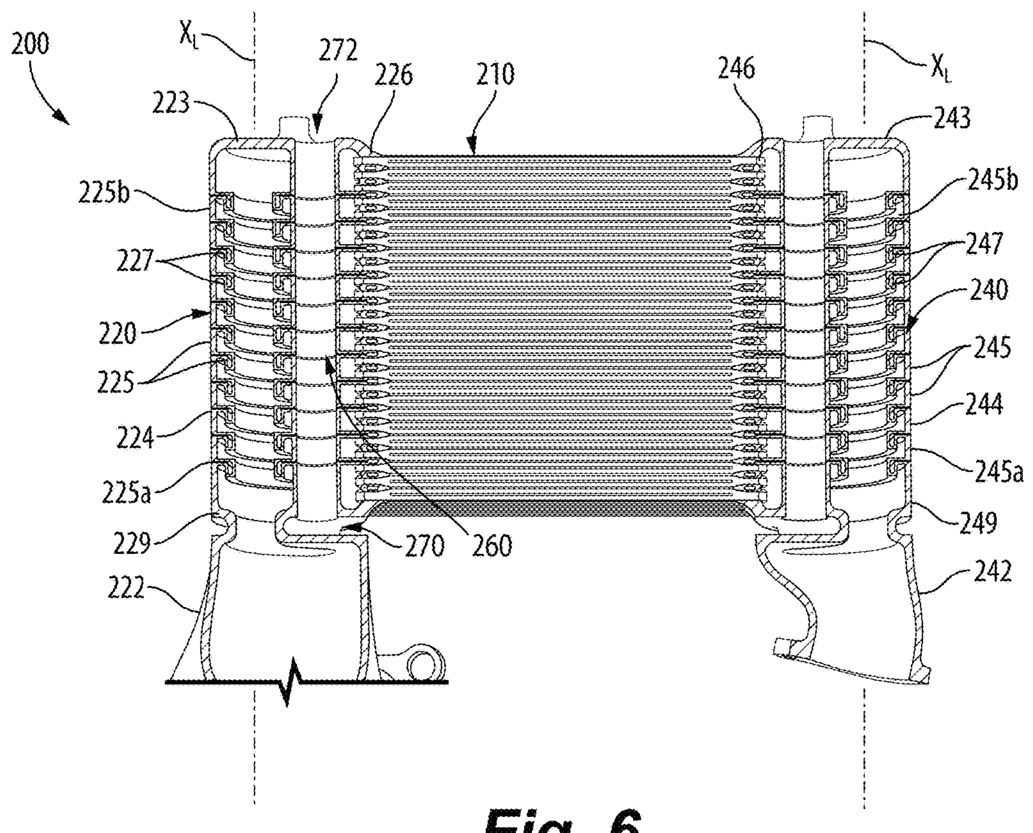
FIG. 6 is horizontal cross-sectional view of another heat exchanger having compliant inlet and outlet manifolds that have a bellows-type configuration.
Figure 7:
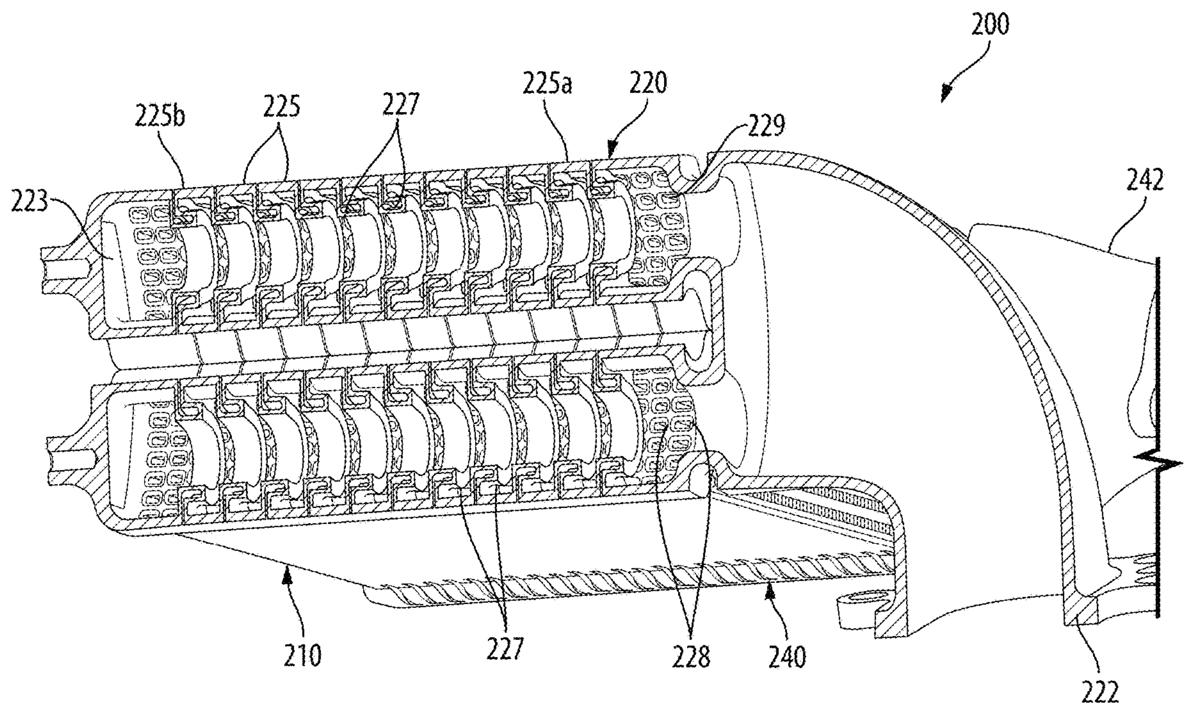
FIG. 7 is a cross-sectional view taken along line 7-7 of FIG. 6.
Figure 8:
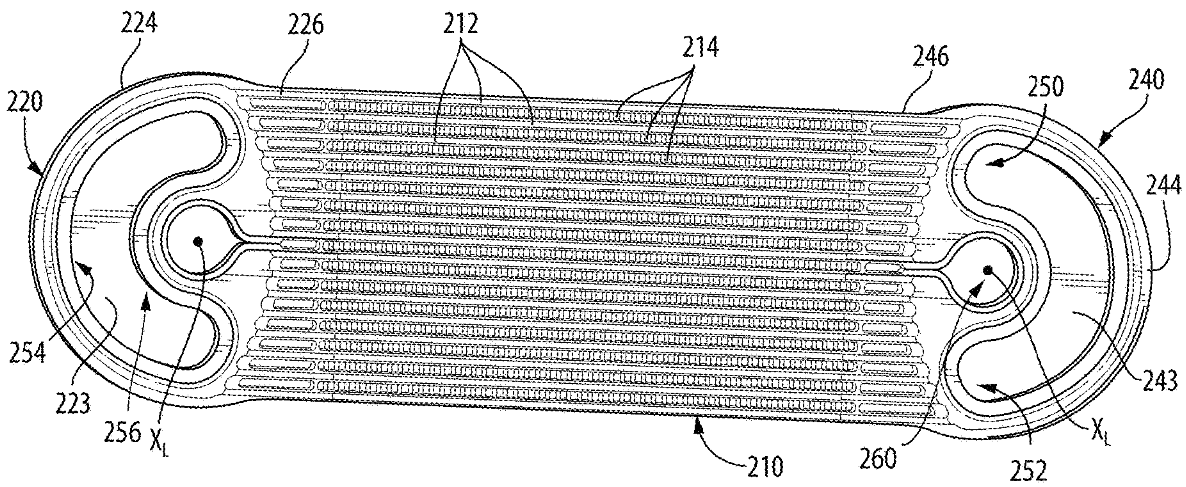
FIG. 8 is a cross-sectional view taken along line 8-8 of FIG. 6.

Referring now to FIGS. 6 and 7, there is illustrated another heat exchanger constructed in a accordance with the subject disclosure and designated generally by reference numeral 200. Heat exchanger 200 has a generally rectangular or box-like core 210 that includes a plurality of parallel layered flow passages 212 for accommodating a first fluid flow having a first temperature, and a plurality of layered cross-flow passages 214 in thermal communication with the layered flow passages 212 for accommodating a second fluid flow having a second temperature lower than the first temperature. The alternating multi-layered, cross-flow construction of the heat exchanger core 210 is best seen in FIG. 8. Those skilled in the art will readily appreciate that the number and size of the layered flow passages 212 and cross-flow passages 214 can vary by design and/or application. Furthermore, the overall shape of the heat exchanger core 210 could vary by design and application and need not have a generally rectangular configuration, as depicted in the subject disclosure.

An elongated compliant inlet manifold 220 is operatively associated with an inlet side of the core 210. The inlet manifold 220 includes a flanged fluid inlet 222 to receive the first fluid flow, a manifold wall 224, an end wall 223 enclosing the manifold opposite the fluid inlet 222 and an inboard interface region 226 joined integrally with the core 210. The manifold was 224 of inlet manifold 220 has a bellows-type construction to accommodate expansion (e.g., thermal and pressure induced expansion). The inboard interface region 226 of inlet manifold 220 includes an array of inflow ports 228 in fluid communication with the layered flow passages 212 of the core 210, enabling fluid flow therebetween.

An elongated complaint outlet manifold 240 is operatively associated with an outlet side of the core 210. The outlet manifold 240 includes a flanged fluid outlet 242 for egress or discharge of the first fluid flow, a manifold wall 244, an end wall 243 enclosing the manifold opposite the fluid outlet 242 and an inboard interface region 246 joined integrally with the core 210. The manifold wall 244 of the outlet manifold 240 has a bellows-type construction to accommodate expansion. The inboard interface region 246 of the outlet manifold 240 also includes an array of outflow ports in fluid communication with the layered flow passages 212 of the core 210, enabling fluid flow therebetween. While not shown, the array of outflow ports in outlet manifold 240 is identical to the array of inflow ports 228 of inlet manifold 120, which are shown in FIG. 5.

Referring again to FIGS. 6 and 7, the manifold wall 224 of the inlet manifold 220 and the manifold wall 244 of the outlet manifold 240 each include a plurality of integrally formed longitudinally spaced apart wall section or segments 225, 245. Adjacent wall segments 225, 245 are integrally connected to one another by shaped expansion joints 227, 247. Each shaped expansion joint 227, 247 has a generally rectangular shaped cross-sectional configuration in a plane extending radially from the longitudinal axis of the manifold. Those skilled in the art will readily appreciate that the shaped expansion joints 227, 247 can be shaped differently, and can include straight or linear surfaces and/or curved or rounded surfaces when viewed in a cross-sectional plane extending radially from the longitudinal axis $X_L$ of the manifold. The example expansion joints 227, 247 are similarly L-shaped to those of FIG. 5*a* but have slightly different proportions.

Figure 9:
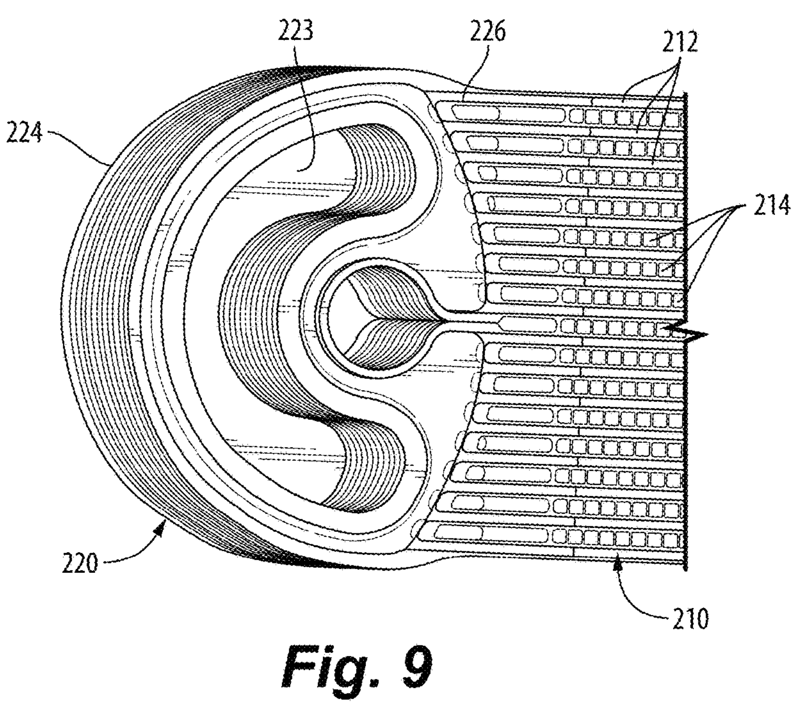
FIG. 9 is a perspective view in cross-section of a section of a portion of the inlet manifold of the of the heat exchanger shown in FIG. 6.

As best seen in FIGS. 8 and 9, the manifold wall 224 of the inlet manifold 220 and the manifold wall 244 of the outlet manifold 240 each extend along a respective longitudinal axis $X_L$ and each manifold wall 224, 244 has a generally crescent shaped configuration in a cross-section taken transverse to the longitudinal axis thereof. The crescent extends between first 250 and second 252 ends proximate the core so as to partially surround an axially-extending void 260. The void 260 (FIG. 6) extends axially between an open first end 270 and an open second end 272. The manifold expansion joint extends along both an inner diameter portion 254 of the manifold at its outer wall and an inner diameter portion 256 of the crescent at the void.

As shown, each wall segment 225, 245 has a common longitudinal width-wise dimension. However, it is envisioned and well within the scope of the subject disclosure that the number and width of the spaced apart wall segments 225, 245 can vary by design and/or application. The first or initial wall segment 225*a* of the manifold wall 224, which is located adjacent the fluid inlet 222, is joined to the inlet plenum 229 of the inlet manifold 220 by a shaped expansion joint 227. The last or ultimate wall segment 225*b* of the manifold wall 224, which is located adjacent the end wall 223, is joined to the terminal section of the inlet manifold 220 by a shaped expansion joint 227.

The outlet manifold 240 has a similar construction, whereby the first or initial wall segment 245*a* of the manifold wall 244, which is located adjacent the fluid outlet 242, is joined to the outlet plenum 249 of the outlet manifold 240 by a shaped expansion joint 247. The last or ultimate wall segment 245*b* of the manifold wall 244, which is located adjacent the end wall 243, is joined to the terminal section of the outlet manifold 240 by a shaped expansion joint 247. Those skilled in the art will readily appreciate that the shape, size, width, depth, frequency, amplitude, pitch and/or orientation of the shaped expansion joints 227, 247 can vary by design and/or application.

It is envisioned that the heat exchanger of the subject disclosure can be manufactured in a conventional manner where components or parts are machined and/or casted and then joined together by welding, brazing or fastening. However, it is also envisioned that the heat exchanger of the subject disclosure can be made with one or more additive manufacturing processes. For example, certain embodiments can be made with powder bed fusion (PBF) (e.g., using a laser or electron beam), directed energy deposition (DED), fused deposition modeling (FDM), cold spray additive manufacturing, or any other suitable process as appreciated by those having ordinary skill in the art.

Certain embodiments can include orienting a part-to-be-built relative to a build direction to reduce or eliminate support structure, for example. Certain embodiments can include any suitable infill geometry for a desired density and/or article strength, for example. Certain embodiments can include orienting a part-to-be-built relative to a build direction to provide a desired layer-wise orientation to provide strength in a desired direction. Embodiments can include the use of any suitable materials (e.g., including one or more metals, plastics, ceramics, alloys, etc.). Embodiments can include any suitable combinations of additive manufacturing processes, as well as any combinations of subtractive manufacturing processes to arrive at a desired geometry and/or characteristic of the additively manufactured article. Certain embodiments can include any suitable post processing method (e.g., milling, sintering, high pressure fusion, chemical treatment, polishing, etc.) for finishing the additively manufactured article.

Those skilled in the art will readily appreciate that as a result of the heat exchanger design of the subject disclosure, thermal stress is reduced significantly due to the bellows configuration, which adds structural compliance in the manifold. Pressure stress is also reduced due to the bellows construction, which acts like a stiffener. Because the pressure stress is reduced, the manifold wall thickness can also be reduced, leading to a reduction in the overall weight of the heat exchanger. And because the manifold wall thickness can be reduced, the manifold temperature can increase faster during transient periods, which helps to advantageously reduce the temperature gradient between the core and the manifold. As a result of the compliant manifold design disclosed herein, the heat exchanger of the subject disclosure can handle much higher temperatures and pressure loads than conventional heat exchangers known in the art.

While the subject disclosure has been shown and described with reference to preferred embodiments, those skilled in the art will readily appreciate that changes and/or modifications may be made thereto without departing from the scope of the subject disclosure.

What is claimed is:

1. A heat exchanger comprising:

a) a core including a plurality of parallel layered flow passages for accommodating a first fluid flow having a first temperature, and a plurality of layered cross-flow passages in thermal communication with the layered flow passages for accommodating a second fluid flow having a second temperature lower than the first temperature;

b) an inlet manifold operatively associated with an inlet side of the core and including a fluid inlet to receive the first fluid flow, a manifold wall having a bellows-type construction to accommodate expansion and an interface with the core that includes an array of inflow ports in fluid communication with the layered flow passages of the core; and c) an outlet manifold operatively associated with an outlet side of the core and including a fluid outlet for egress of the first fluid flow, a manifold wall having a bellows-type construction to accommodate expansion and an interface with the core that includes an array of outflow ports in fluid communication with the layered flow passages of the core, wherein:

the manifold wall of each manifold includes a plurality of integrally formed longitudinally spaced apart segments that are each connected to one another by a shaped expansion joint having straight/linear and/or curved/rounded surfaces; and each shaped expansion joint has an L-shaped configuration in a cross-sectional plane extending radially from the longitudinal axis of the manifold.

2. The heat exchanger of claim 1, wherein the manifold wall of each manifold extends along the longitudinal axis and has a semi-circular configuration in a cross-section taken transverse to the longitudinal axis.

3. The heat exchanger of claim 1, wherein the manifold wall of each manifold extends along the longitudinal axis and has a crescent-shaped configuration in a cross-sectional plane taken transverse to the longitudinal axis.

4. The heat exchanger of claim 3, wherein:

the crescent-shaped configuration has a first end and a second end; and the crescent-shaped manifold and core cooperate to surround an open volume, the open volume open at a pair of axial ends of the open volume.

5. The heat exchanger of claim 1, wherein:

the L-shaped configuration has a void having a first section corresponding to the leg of the L extending inward and a second section corresponding to the foot of the L extending axially with respect to the longitudinal axis of the associated manifold.

6. A heat exchanger comprising:

a) a core including a plurality of parallel layered flow passages for accommodating a first fluid flow having a first temperature, and a plurality of layered cross-flow passages in thermal communication with the layered flow passages for accommodating a second fluid flow having a second temperature lower than the first temperature;

b) an inlet manifold operatively associated with an inlet side of the core and including a fluid inlet to receive the first fluid flow, a manifold wall extending along a longitudinal axis and including a plurality of integrally formed longitudinally spaced apart wall segments that are each separated from one another by a shaped expansion joint, and an interface with the core that includes an array of inflow ports in fluid communication with the layered flow passages of the core; and c) an outlet manifold operatively associated with an outlet side of the core and including a fluid outlet for egress of the first fluid flow, a manifold wall extending along a longitudinal axis and including a plurality of integrally formed longitudinally spaced apart wall segments that are each separated from one another by a shaped expansion joint, and an interface with the core that includes an array of outflow ports in fluid communication with the layered flow passages of the core, wherein:

the manifold wall of each manifold has a crescent-shaped configuration in a cross-section taken transverse to the longitudinal axis, the crescent-shaped configuration having a first end and a second end; and the crescent-shaped manifold and core cooperate to surround an open volume, the open volume being open at a pair of axial ends of the open volume.

7. The heat exchanger of claim 6, wherein each shaped expansion joint has a rectangular shape in a cross-sectional plane extending radially from the longitudinal axis of the manifold.

8. The heat exchanger of claim 6, wherein each shaped expansion joint has a dovetail shaped configuration in a cross-sectional plane extending radially from the longitudinal axis of the manifold.

9. The heat exchanger of claim 6, wherein each shaped expansion joint has an L-shaped configuration in a cross-sectional plane extending radially from the longitudinal axis of the manifold.

10. The heat exchanger of claim 6, wherein each shaped expansion joint has a T-shaped configuration in a cross-sectional plane extending radially from the longitudinal axis of the manifold.

11. The heat exchanger of claim 6, wherein each shaped expansion joint has a rounded configuration in a cross-sectional plane extending radially from the longitudinal axis of the manifold.

12. The heat exchanger of claim 6, wherein the core has a right parallelepiped configuration.

13. A heat exchanger comprising:

a) a core including a plurality of parallel layered flow passages for accommodating a first fluid flow having a first temperature, and a plurality of layered cross-flow passages in thermal communication with the layered flow passages for accommodating a second fluid flow having a second temperature lower than the first temperature;

b) an inlet manifold operatively associated with an inlet side of the core and including a fluid inlet to receive the first fluid flow, a manifold wall having a bellows-type construction to accommodate expansion and an interface with the core that includes an array of inflow ports in fluid communication with the layered flow passages of the core; and c) an outlet manifold operatively associated with an outlet side of the core and including a fluid outlet for egress of the first fluid flow, a manifold wall having a bellows-type construction to accommodate expansion and an interface with the core that includes an array of outflow ports in fluid communication with the layered flow passages of the core, wherein:

the manifold wall of each manifold extends along a longitudinal axis and has a crescent-shaped configuration in a cross-sectional plane taken transverse to the longitudinal axis, the crescent-shaped configuration having a first end and a second end; and the crescent-shaped manifold and core cooperate to surround an open volume, the open volume open at a pair of axial ends of said open volume.

14. A heat exchanger comprising:

a) a core including a plurality of parallel layered flow passages for accommodating a first fluid flow having a first temperature, and a plurality of layered cross-flow passages in thermal communication with the layered flow passages for accommodating a second fluid flow having a second temperature lower than the first temperature;

b) an inlet manifold operatively associated with an inlet side of the core and including a fluid inlet to receive the first fluid flow, a manifold wall extending along a longitudinal axis and including a plurality of integrally formed longitudinally spaced apart wall segments that are each separated from one another by a shaped expansion joint, and an interface with the core that includes an array of inflow ports in fluid communication with the layered flow passages of the core; and c) an outlet manifold operatively associated with an outlet side of the core and including a fluid outlet for egress of the first fluid flow, a manifold wall extending along a longitudinal axis and including a plurality of integrally formed longitudinally spaced apart wall segments that are each separated from one another by a shaped expansion joint, and an interface with the core that includes an array of outflow ports in fluid communication with the layered flow passages of the core, wherein:

each shaped expansion joint has an L-shaped configuration in a cross-sectional plane extending radially from the longitudinal axis of the manifold.

* * * * *